United States Patent
Bloch et al.

[19]

[11] Patent Number: 5,923,193

[45] Date of Patent: Jul. 13, 1999

[54] METHOD AND APPARATUS FOR TRANSFERRING SIGNALS BETWEEN MULTIPLE CLOCK TIMING DOMAINS

[75] Inventors: Peter Bernhardt Bloch; Leonard William Cross, both of Portland; David Richard Jackson, Hillsboro; Ali Serhan Oztaskin, Beaverton, all of Oreg.

[73] Assignee: Intel Corporation, Santa Clara, Calif.

[21] Appl. No.: 08/764,608

[22] Filed: Dec. 11, 1996

[51] Int. Cl.[6] ........................................... H03K 5/135
[52] U.S. Cl. ........................... 327/141; 327/144; 327/145
[58] Field of Search ..................... 327/141, 144, 327/145, 147, 152, 153, 154, 156, 161, 162, 163, 202, 211, 212, 213; 395/880, 881, 537, 553

[56] References Cited

U.S. PATENT DOCUMENTS

5,004,933  4/1991  Widener .................................. 327/141
5,259,006  11/1993  Price et al. ............................. 327/141
5,418,825  5/1995  Cantrell et al. ........................... 377/48
5,708,801  1/1998  Williams et al. ........................ 395/551

*Primary Examiner*—Timothy P. Callahan
*Assistant Examiner*—Tuan T. Lam
*Attorney, Agent, or Firm*—Howard A. Skaist

[57] ABSTRACT

Briefly, in accordance with one embodiment, an integrated circuit includes: electronic circuitry for transferring digital data signals along a digital data signal path between different clock timing domains. The clock timing domains have a common higher frequency source clock. A first clock timing domain clock signal has a relatively fixed phase and a second clock timing domain clock signal has a relatively varying phase. The electronic circuitry includes delay elements in clock signal paths associated with the digital data signal path so that along the digital data signal path, clock signals in different clock timing domains are respectively staggered for a relatively short time compared with a given cycle of the source clock. The electronic circuitry further includes a digital data signal path including a data value retention element to delay the transfer of digital data signals between different clock timing domains at selected times.

23 Claims, 3 Drawing Sheets

METHOD AND APPARATUS FOR TRANSFERRING SIGNALS BETWEEN MULTIPLE CLOCK TIMING DOMAINS

BACKGROUND OF THE INVENTION

1. Field of the Invention

The present invention relates to transferring signals and, more particularly, to transferring signals between multiple clock timing domains.

2. Background Information

A common problem in digital communications is to transfer digital signals between multiple clock timing domains. It is not unusual to transmit digital signals between clock timing domains having the same underlying frequency clock, but different or varying phase with respect to each other. Typically, to solve this problem, synchronization or double synchronization may be introduced between the clock domains, such as by using a series of flip-flops or other hardware so that the timing of the digital signals transmitted is aligned. Therefore, the signals being transferred from one clock timing domain may be delayed by one or more clock cycles so that the signals may be synchronized with the clock signals in another clock timing domain, for example. Introducing such synchronization may cause undesirable and sometimes unpredictable delays in the communications path and, therefore, may result in performance degradation. Furthermore, as indicated previously, additional circuitry is typically required to delay the signals being transferred from one clock timing domain and to then synchronize those signals to another clock timing domain. Such additional circuitry will typically increase hardware complexity and cost. Such approaches also may create problems in the validation stage of a circuit design due to the use of circuit models to validate the design for different circuit models. These synchronizing circuit elements are typically modeled using different assumptions. If more than one circuit model is employed, as is frequently the case, then it becomes a difficult problem to validate the design. For example, different circuit models employ different assumptions regarding sample-and-hold times for digital signals to be acquired by digital circuitry without introducing metastability issues. The issue may also span different simulators. In some simulations, for example, no set-up or hold problems exist. In gate level simulations, however, these problems do exist. If inconsistencies occur in the validation performed by the different circuit models, then the design has not been successfully validated and sorting out the inconsistencies is an extremely complex problem. A need, therefore, exists for a technique of transferring signals between multiple clock timing domains that reduces or addresses these problems.

SUMMARY OF THE INVENTION

Briefly, in accordance with one embodiment, an integrated circuit includes: electronic circuitry for transferring digital data signals along a digital data signal path between different clock timing domains. The clock timing domains have a common higher frequency source clock. A first clock timing domain clock signal has a relatively fixed phase and a second clock timing domain clock signal has a relatively varying phase. The electronic circuitry includes delay elements in clock signal paths associated with the digital data signal path so that along the digital data signal path, clock signals in different clock timing domains are respectively staggered for a relatively short time compared with a given cycle of the source clock. The electronic circuitry further includes a digital data signal path including a data value retention element to delay the transfer of digital data signals between different clock timing domains at selected times.

Briefly, in accordance with another embodiment of the invention, a method of transferring digital data signals along a digital data signal path between different clock timing domains, the clock timing domains having a common higher frequency source clock, a first clock timing domain having a relatively fixed phase, a second clock timing domain having a relatively varying phase, includes the following steps. Clock signals associated with the digital data signal path are delayed so that clock signals in different clock timing domains are, respectively, staggered for only a relatively short time compared with a given cycle of the source clock and the transfer of a digital data signal along the digital data signal path is selectively delayed.

BRIEF DESCRIPTION OF THE DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description, when read with the accompanying drawings in which:

DETAILED DESCRIPTION OF THE INVENTION

In the following detailed description numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Embodiments of the present invention allow communication without the need for overly complex synchronization circuitry between multiple clock timing domains. Embodiments of the present invention may be employed with clock frequency domains that are either derived or divided down from the same source clock frequency, but which have different or varying clock phases with respect to each other. Therefore, the clock timing domains have a common higher frequency source clock. A high through-put communication path between, different but related clock domains with only a small delay, while addressing metastability concerns, may be achieved by embodiments in accordance with the present invention. In contrast, in prior art approaches, multiple flip-flops performing synchronization would be employed to transfer digital data signals between multiple clock domains, typically resulting in undesirable and sometimes unpredictable delays in the communication path and, thus, resulting in performance degradation. Such circuitry would also typically increase circuitry cost and complexity.

Figure 3:
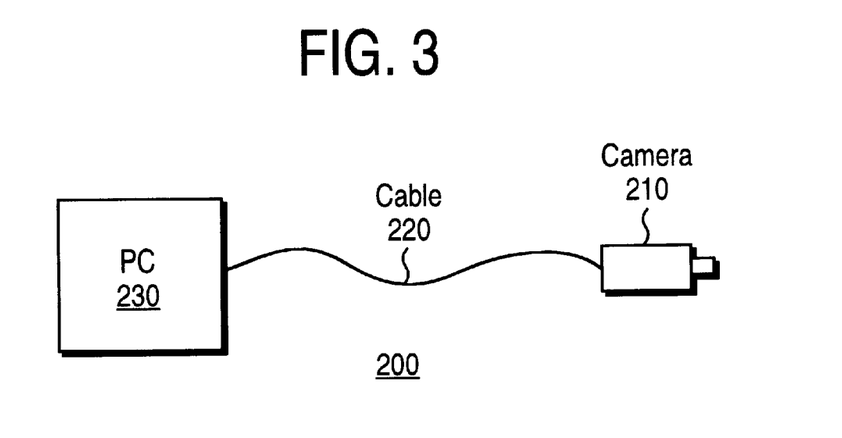
FIG. 3 is a schematic diagram illustrating an embodiment of a system employing the embodiment of FIG. 1.

In one application, although, of course, the present invention is not restricted in scope in this respect, a communication path may exist between a personal computer, such as PC 230 shown in FIG. 3, and a camera, such as camera 210 shown in FIG. 3. As illustrated, a communication path exists via cable 220. In this particular embodiment, although the invention is not restricted in scope in this respect, the signals transferred between the PC and the camera comply with the Universal Serial Bus (USB) Specification, Revision 1.0, Jan. 15, 1996, Copyright® 1996, Compaq Computer Corporation, Digital Equipment Corporation, IBM PC Company, Intel Corporation, Microsoft Corporation, NEC, Northern Telecom, herein incorporated by reference.

Figure 4:
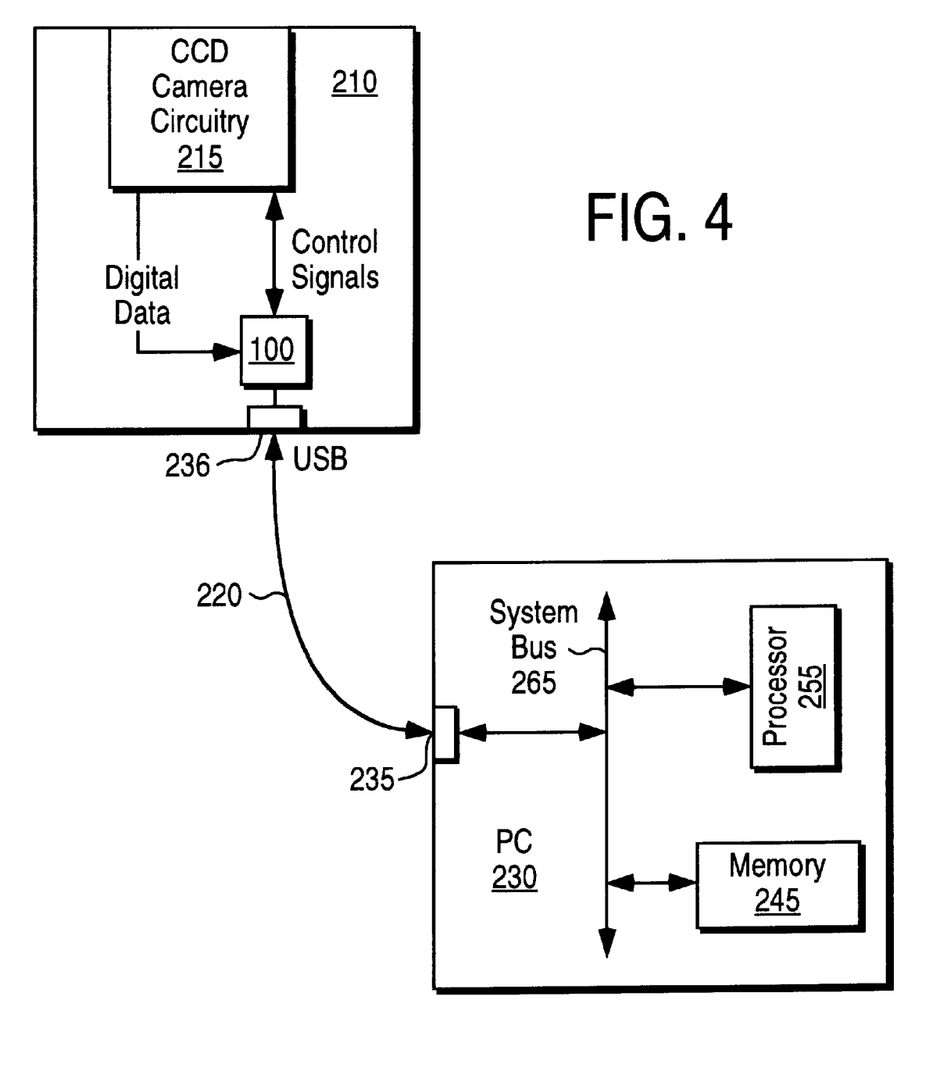
FIG. 4 is a schematic diagram illustrating FIG. 3 in greater detail.

FIG. 4 illustrates the system of FIG. 3 in greater detail. In this particular embodiment, a charge-coupled device (CCD) camera is employed. CCD camera 210 transmits digital camera data in the form of pixels to PC 230 unidirectionally. Likewise, control signals are transferred from camera 210 to PC 230 and from PC 230 to camera 210. At a high level, interface integrated circuit chip 100 provides an interface between CCD camera circuitry 215 and cable 220. As previously indicated, signals provided along cable 220 conform with the USB specification. Interface chip 100 includes circuitry to handle communicating digital camera data from CCD camera circuitry 215 to the PC and control signals bidirectionally between CCD camera circuitry 215 and the PC. In this system embodiment, interface chip 100 receives signals from PC 230. The PC has an internal frequency. Via the cable, the PC sources a signal stream to camera 210 from which a clock signal is derived which exists in a clock timing domain, referred to here as the second clock domain. Those signals in the second clock domain are therefore transmitted, within interface chip 100, to another clock timing domain, referred to here as the first clock domain, so that the signals may be further processed by the camera. Likewise, interface chip 100 receives signals from the CCD camera circuitry and transmits them via cable 220 to PC 230. The signals transferred between multiple clock domains are referred to generally as digital data signals, although such signals may comprise control information signals or camera data signals. As indicated in FIG. 4, cable 220 plugs or couples into a USB port 235 of PC 230 and a USB port 236 of CCD camera 210. Therefore, in one embodiment, via system bus 265 for PC 230, the signals transmitted from CCD camera 210 may be transferred to memory 245 and then processed by processor 255. Processor 255 may comprise a microprocessor available from Intel Corporation, such as a Pentium® or Pentium® Pro microprocessor, although the invention is not restricted in scope in this respect. Those skilled in the art will appreciate that this is a high-level system description provided so as not to obscure the present invention. Many more complex system embodiments may be employed in accordance with the present invention. Likewise, the invention is not restricted to use in this particular application. An embodiment in accordance with the invention may be employed in any environment in which digital data signals are transferred between multiple clock timing domains.

Figure 1:
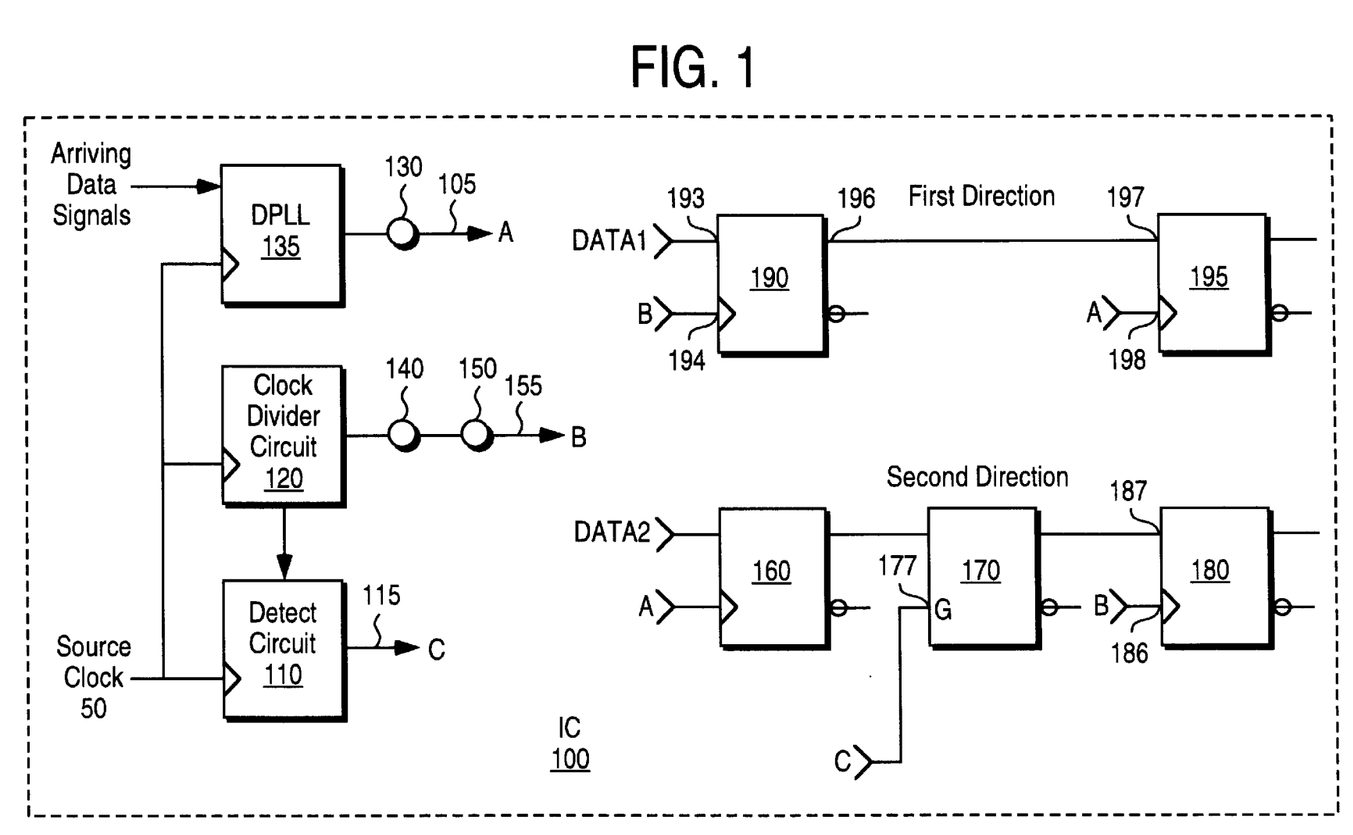
FIG. 1 is a schematic diagram illustrating an embodiment in accordance with the present invention.

When digital data signals are received, such as by the camera from the PC, in this particular embodiment they are over-sampled by a clock signal that may also be employed to produce timing in the form of a clock signal. In this particular embodiment, for example, a 48 MHz oversampling clock is employed. A 12 MHz clock signal may then be derived from the data in this particular embodiment using, for example, a digital phase locked loop (DPLL) as illustrated in FIG. 1, although the invention is not limited in scope in this respect. Other techniques may be employed to derive the clock signal from the digital data signals. Likewise, the 48 MHz sampling clock signal may be divided down to produce a 12 MHz clock signal. Thus, although the 12 MHz clock signal and the derived 12 MHz clock signal, after processing, are both 12 MHz, the signals have different or varying phases with respect to each other. In this context, the divided down clock signal has a relatively fixed phase and is referred to the first clock timing domain or first clock domain, whereas the clock signal having a relatively varying phase, which is the derived clock signal after DPLL processing, is referred to as the second clock timing domain or second clock domain.

To communicate between the PC and the camera, it is desirable to have a way to transfer digital data signals from the second clock timing domain to the first clock timing domain. More specifically, it is desirable to transfer signals from the second clock domain to the first clock domain for the transmission of information from the PC to the camera. Likewise, it is desirable to transfer digital data signals from the camera to the PC. However, because in transferring signals from the camera to the PC the signals originate from the camera end of the cable, the same varying phase synchronization issues are not present in comparison with the situation where the camera receives signals from the PC via the cable. Therefore, the details for transferring digital data signals from the camera to the PC will not be considered further. In contrast, in transferring signals from the PC to the camera, issues arise regarding transferring signals from the second clock domain to the first and vice-versa, because in addition to camera data signals, frequently control signals are transmitted back and forth. This multiple clock domain signal transfer occurs within interface chip 100, although the invention is not limited in scope in this respect. As previously indicated, synchronizing elements, such as a series of flip-flops, may be employed, although this may result in performance degradation and problems related to state predictability.

FIG. 1 illustrates an embodiment of a device for transferring digital data signals between multiple clock domains in accordance with the present invention. As illustrated in FIG. 1, embodiment 100 is incorporated in an integrated circuit, although the invention is not limited in scope in this respect. FIG. 1 illustrates a signal path 105 along which a clock signal having a varying phase, as previously described, is provided. As illustrated, circuitry is employed, such as a digital phase locked loop (DPLL), to provide this clock signal. The invention, of course, is not restricted in scope to a clock signal derived from a digital phase locked loop. The clock signal produced has a varying phase; such a clock signal may be provided by a variety of techniques. Likewise, a source clock signal 50, in this particular embodiment having a 48 MHz frequency, is provided to clock divider circuit 120, which divides down the 48 MHz clock signal to produce a 12 MHz clock signal. In this embodiment, the source clock signal is also provided to detect circuit 110. Detect circuit 110 detects a change in the state of the fixed phase 12 MHz clock signal that will occur on the next 12 MHz clock pulse, as will be explained in more detail hereinafter. As will be explained in more detail, the invention is not restricted to being divided down by a factor of 4. However, in this particular embodiment, detect circuit 110 provides a signal for one out of four clock pulses of the source clock.

In this particular embodiment, the clock signal for the first clock timing domain, referred to as the fixed phase clock signal, provided by clock divider 120 along path 150 at point B, is delayed with respect to the clock signal for the second clock timing domain, referred to as the varying phase clock signal, provided along signal path 105 at point A. In FIG. 1, circuit elements 130, 140, and 150 comprise delay elements. Circuit elements 190, 195, 160, and 180 comprise digital data storage elements, such as conventional flip-flops. Thus, in this particular embodiment, the delay elements delay the clock signals on the order of nanoseconds, which is small compared with one cycle of the source clock, although less delay is possible. Although a variety of embodiments may be employed, a series of digital delay elements, such as inverters, is a typical way to implement such a delay element. Likewise, another typical way to implement these delay elements includes employing analog circuit delay elements. In this particular embodiment, a data value retention element 170 comprising a latch is placed in the digital data signal path between flip-flop 160 and flip-flop 180, although the invention is not restricted in scope to a latch.

As illustrated, a first direction and a second direction are provided in this embodiment. For the first direction, a digital data signal is transferred from the fixed phase clock domain (first) to the varying phase clock domain (second). For example, a control signal may be communicated. For the second direction, a digital data signal received that is in the varying phase clock domain (second) is transferred to the fixed phase clock domain (first). This may occur for the transfer of camera data or, again, a control signal. In this particular embodiment, this is accomplished at least in part by delay elements 130, 140 and 150. The effect of these elements is to stagger the first clock domain clock signals with respect to the second clock domain clock signals for a given cycle of the source clock. Therefore, clock signal paths associated with digital data signal paths include delay elements so that along the digital data signal path, clock signals in different clock timing domains are respectively staggered for a given cycle of the source clock. As previously indicated in this embodiment, the delay is on the order of nanoseconds. In this particular embodiment, the varying phase domain clock signal occurs first, while the fixed phase domain clock signal occurs after the varying phase domain clock signal in any given source clock cycle. The desirable effect of this is that digital data signals coming from the, later, fixed phase clock domain may be sent to the earlier or varying phase clock domain without "sample-and-hold time" concerns. More particularly, as the digital data signals from the fixed phase clock domain are transferred to the varying phase clock domain, such as from digital data storage element 190 to digital data storage element 195 in FIG. 1, there is no need to introduce additional circuit elements to ensure that these timing considerations are accounted for, and, therefore, metastability problems are addressed. More particularly, the digital data signal from output port 196 of flip-flop 190 should arrive at input data port 197 of flip-flop 195 sufficiently ahead of the derived clock signal arriving at clock port 198 so that flip-flop 195 should successfully acquire the digital data signal. However, introducing delay elements in this fashion also reduces the amount of time available as set-up time between the two clock signals.

Furthermore, a metastability issue may arise in transferring signals from the varying phase clock domain to the fixed phase clock domain. However, this problem is addressed in this particular embodiment by the placement of a data value retention element 170 in the digital data signal path between digital data storage element 160 and digital data storage element 180. The operation of data value retention element 170 is distinguished from the operation of digital data storage elements 160 and 180, as described in more detail hereinafter. Specifically, at selected times, data value retention element 170 is employed to retain an immediately prior value of the digital data signal, as will be explained. Likewise, a signal is created based on the source clock in this particular embodiment which detects that a change in state for the clock signal for the fixed phase clock domain will occur on the next clock pulse. If this change is anticipated, latch 170 is closed just prior to the active edge for that source clock cycle in which the fixed clock is changing. In this embodiment, the active edge is the rising edge. In this particular embodiment, this effectively prevents the data value retention element from changing state to reflect the digital data signal applied to the input data port of that element. Therefore, the current digital signal value is not passed along the data signal path to flip-flop 180, thus addressing timing concerns arising with respect to flip-flop 180. Instead, data value retention element 170 retains the immediately prior value of the digital data signal. The latch is open again later in a subsequent cycle of the source clock so that the current digital data signal may be appropriately acquired by flip-flop 180 in a subsequent clock cycle of the source clock. This approach, therefore, addresses the metastability problem because the set-up and hold times for flip-flop 180 have been met. Furthermore, as will be appreciated by one skilled in the art, the metastability issues for a circuit involving improperly aligned synchronous clock signals are typically more difficult than those employing a asynchronous clock signals. Here, at selected times, latch 170 retains the immediately prior digital data signal value obtained from digital data storage element 160 until the current digital data signal may be successfully transferred to digital data storage element 180. It is, of course, understood that acquiring the digital data signal by these digital data storage elements effectively transfers the digital data signal between clock timing domains.

Digital data storage elements 190, 195, 160 and 180, in this particular embodiment, flip-flops, acquire digital data signals applied to the input data ports of the flip-flops. As illustrated, in this embodiment, by acquiring such digital data signals based upon the clock signals applied to the clock ports of these flip-flops, the digital data signals are aligned with the timing of the clock signals applied to the particular flip-flop. In direct contrast, data value retention element 170 operates to delay the transfer of a digital data signal. As previously indicated, the digital data signal to be transferred is not immediately acquired by data value retention element 170. Instead, data value retention element 170 acquires or retains the preceding digital data value or the last digital data value transferred in situations where the phase of the clock signal of the second clock timing domain would introduce a timing hazard. This has the desirable effect previously described. In this particular embodiment, latch 170 closes for one out of four phases. When latch 170 opens on a subsequent clock cycle of the source clock, the current digital data signal is then transferred as desired. However, if the phase of the clock signal of the second clock timing domain would not introduce a timing hazard, e.g., three-quarters of the time, then the current digital data signal flows through the open latch 170.

Figure 2:
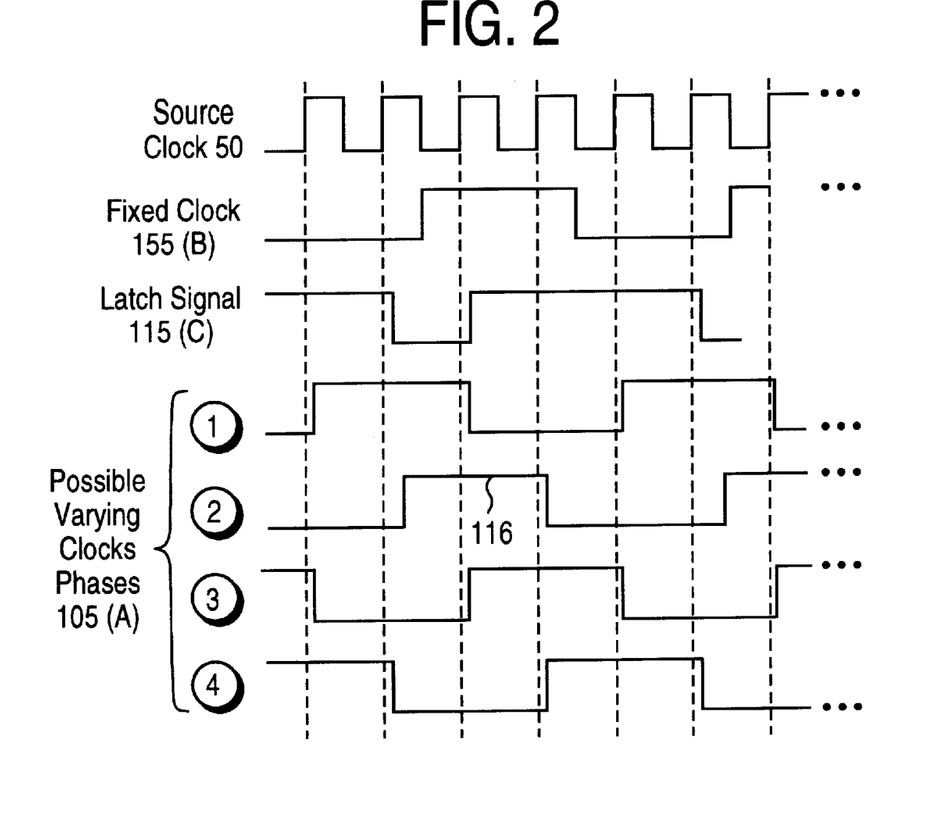
FIG. 2 is a timing diagram illustrating timing signals for the embodiment shown in FIG. 1.

One aspect of this embodiment of a device for transferring signals between multiple clock timing domains relates to detect circuit 110. The invention, of course, is not restricted to a particular detection circuit. Many different detection circuits are possible. However, detect circuit 110 detects that a change in state of the clock signal for the fixed phase clock domain will occur on the next clock pulse. In this particular embodiment, the logic anticipates the change for the active edge of the fixed phase clock signal which comprises the rising edge. Therefore, in this particular embodiment, a signal is provided to data value retention element 170 for one-quarter (¼) of the clock pulses of the source clock. As previously indicated, data value retention element 170 provides a technique so that the set-up and hold-times for flip-flop 180 in this particular embodiment are met. The reason some risk exists regarding meeting the set-up and hold times for flip-flop 180 is due to the varying nature of the phase of the derived signals for the second clock timing domain. A risk occurs that the phase of the fixed phase clock domain clock signal and the phase of the varying phase clock domain clock signal will be in sufficiently close temporal proximity that a metastability problem may exist, as illustrated in FIG. 2 and explained in more detail hereinafter. Although data value retention element 170 provides a technique to address this risk, the cost is some delay introduced in the transfer of the digital data signal. Nevertheless, the delay here is significantly improved over alternative approaches. Here, the delay is introduced for approximately ¼ of the clock pulses of the same clock, for example, when signals from the PC are transmitted to the camera via cable 220, which is statistically less than one clock cycle. If conventional approaches were employed, the delay would be more significant and introduced for every clock pulse. Furthermore, if the fixed clock were divided down by an even greater ratio, instead of 4 to 1 for this particular embodiment, additional improvement would be realized. Another advantage of this approach is that it is extremely easy to validate the design using state-of-the-art circuit models. If a more complex approach employing flip-flops to perform synchronization were employed, for example, inconsistencies might arise between different circuit models due to assumptions regarding "set-up and hold" times and metastability resolution.

The timing relationship between the various clock signals may be illustrated by referring to FIG. 2. Illustrated is the source clock signal produced by the 48 MHz clock 50, a fixed phase clock domain clock signal produced by clock divider circuit 120 (see 155(B) in FIG. 1), the signal provided by detect circuit 110 to data value retention element 170 (see 115(C) in FIG. 1), and four possible phases of the clock signal for the varying phase clock domain (see 105(A) in FIG. 1). Of these four phases, a metastability problem may be encountered along the second direction data path in FIG. 1 due to the relative timing of the clock signal designated 2 and the fixed phase domain clock signal. This is illustrated in FIG. 2 by the close proximity in time of the two clock signals. Thus, in FIG. 1, for flip-flop 180, an appropriate set-up time should ensure that the data is appropriately acquired. As previously described, this problem is addressed by introducing latch 170 in this particular embodiment and, therefore, delaying the acquiring of the digital data signal by flip-flop 180 until the fixed phase domain clock signal has been applied to flip-flop 180 so that the digital data signal from the varying clock domain may be acquired and, therefore, transferred. Likewise, FIG. 2 also illustrates the set-up and hold time allowed for latch 170. As illustrated, the active edge of the latch signal provided along signal path 115 in FIG. 1 precedes the active edge of signal 116 in FIG. 2 to allow for this time. As illustrated in FIG. 1, this latch signal is provided to gate port 177 of latch 170 so that the latch closes.

The operation of this particular embodiment as shown in FIG. 1 may be explained as follows. The source clock provides a 48 MHz clock signal to circuits 110, 120 and 135. For the first direction data path, clock divider circuit 120 provides a divided down 12 MHz clock signal having a relatively fixed phase to clock input port 194 of flip-flop 190.

Therefore, flip-flop 190 does not acquire the digital data signal applied to input data port 193 of flip-flop 190 until this clock signal is applied. Once flip-flop 190 has acquired the digital data signal, it may be transferred to flip-flop 195 along the digital data signal path coupling positive output port 196 of flip-flop 190 to input data port 197 of flip-flop 195. The clock signal applied to clock port 198 of flip-flop 195 is obtained from circuit 135. As previously indicated, this clock signal is extracted from arriving digital data. For example, a digital phase locked loop may be employed, as illustrated. As further illustrated in FIG. 1, the clock signal applied to flip-flop 190 has a greater delay associated with it than the clock signal applied to flip-flop 195. The effect of this greater delay is that for a given clock cycle of the 48 MHz source clock, the clock signals are staggered with respect to each other in a given cycle of the source clock. Therefore, flip-flop 190 will acquire its digital data signal well before flip-flop 195 acquires its digital data signal. This is desirable to reduce timing hazard issues when the digital data signal is transferred from flip-flop 190 to flip-flop 195 and, therefore, transferred between clock timing domains. Without the introduction of a delay, such a timing hazard might occur due to the varying phase of the clock signal produced by DPLL circuit 135. However, because the clock signal produced by circuit 120 is delayed longer before being applied to flip-flop 190, the clock signal applied to flip-flop 195 will arrive before the digital data signal and, therefore, flip-flop 195 will successfully acquire the signal and the transfer between clock timing domains wilt occur. Likewise, it is noted that due to the varying phase of the clock signal for the second clock timing domain, the set-up time available is only one-fourth of a full 12 MHz clock period.

The operation of the second direction data path for this particular embodiment, however, is more complex. For this path, digital data signals are transferred from the second clock timing domain having a relatively varying phase to the first clock timing domain having a relatively fixed phase. For this transfer, a timing hazard may occur because the clock signal applied to flip-flop 160 is delayed less than the clock signal applied to flip-flop 180. Furthermore, because the clock signal applied to flip-flop 160 has a varying phase, if the approach of the first direction data path were applied to the second direction data path, a situation may arise where a digital data signal is applied to input data port 187 of flip-flop 180 without a clock signal having been applied to clock port 186 of flip-flop 180 sufficiently in advance to ensure that the digital data signal is successfully acquired.

Latch 170 addresses this concern by introducing a selective delay in the signal path. Latch 170 is open most of the time, in this particular embodiment three-quarters of the time. Therefore, most of the time, the output data signal produced by flip-flop 160 is transferred to input data port 187 of flip-flop 180. However, latch 170 addresses the risk of a timing hazard by closing the latch when the clock signal provided by clock divider circuit 120 makes an active transition, in this case on the rising edge. This is illustrated in FIG. 2. Furthermore, as previously described in FIG. 2, the signal applied to gate 177 of latch 170 is applied sufficiently ahead of signal 116 in FIG. 2 to ensure that the latch this particular time, the this particular time, the digital data output signal of flip-flop 160 is not transferred directly to the input port of flip-flop 180. Instead, the digital data signal transfer is delayed until latch 170 opens again. The timing of the signal applied to gate port 177 of latch 170 is such that latch 170 opens after a clock signal has been applied to the clock port 186 of flip-flop 180 for a sufficient time that when the digital data signal is applied to input data port 187 of flip-flop 180, the digital data signal will be successfully acquired and, therefore, transferred between clock timing domains.

While certain features of the invention have been illustrated as described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An integrated circuit comprising: electronic for transferring a digital data signal along a digital data signal between different clock timing domains; said different clock timing domains comprising a first clock timing domain and a second clock timing domain; a common high frequency source clock coupled to a clock generator circuit providing a first and a second clock timing signal; said clock timing signal having a relatively fixed phase; said second clock timing signal having a relatively varying phase; wherein said first and second clock timing domains receive said first and second clock timing signals, respectively:

said clock generator circuit further including delay elements for providing said second and first clock timing signals so that the second and first clock timing signals are respectively staggered for only a relatively short time compared with a given cycle of the common high frequency source clock;

said digital data signal path further including a data value retention element coupled so as to transfer said digital data signal between said second and first clock timing domains so as to delay the transfer of said digital data signal between said second and first clock timing domains at selected times.

2. The integrated circuit of 1, wherein said delay elements comprise digital delay elements.

3. The integrated circuit of claim 1, wherein said delay elements introduce a delay on the order of nanoseconds or less.

4. The integrated circuit of claim 3;

wherein said delay elements stagger the second and first clock timing signals so that the second clock timing signal for the second clock timing domain precedes the first clock timing signal for the first clock timing domain by a fraction of a clock cycle of the common high frequency source clock.

5. The integrated circuit of claim 4, wherein the first clock timing signal and the second clock timing signal have substantially the same frequency.

6. The integrated circuit of claim 4, wherein the data value retention element selectively delays the transfer of said digital data signal from the second clock timing domain to the first clock timing domain.

7. The integrated circuit of claim 6, wherein electronic circuitry further includes another digital data signal path for transferring an additional digital data signal from the first clock timing domain to the second clock timing domain.

8. The integrated circuit of claim 7, wherein said data value retention element comprises a latch coupled so as to close just prior to a change in state of the first timing signal.

9. The integrated circuit of claim 8, wherein an input port of said latch is coupled to an output port of a circuit for detecting a change in state of the first clock timing signal.

10. The integrated circuit of claim 9, wherein said clock generator circuit comprises a digital phase locked loop for producing the second clock timing signal.

11. The integrated circuit of claim 9, wherein said clock generator circuit comprises a clock divider circuit for producing the first clock timing signal.

12. A method for transferring a digital data signal along a digital data path between different clock timing domains, said different clock timing domains comprising a first clock timing domain and a second clock timing domain, a common high frequency source clock being coupled to a clock generator circuit for providing a first and a second clock timing signal, said first clock timing signal having a relatively fixed phase, said second clock timing signal having a relatively varying phase, wherein said first second clock timing domains receive said first and second clock timing signals, respectively, said method comprising:

delaying said second and first clock timing signals so that said second and first clock timing signals are respectively staggered for only a relatively short time compared with a given cycle of the common high frequency source clock; and selectively delaying the transfer of said digital data signal along said digital data signal path between said second and first timing domains.

13. The method of claim 12, wherein said selectively delaying the transfer of said digital data signal along said digital data path comprises selectively closing a latch which is coupled so as to transfer said digital data signal between said second and first clock timing domains in said digital data signal path.

14. The method of claim 12, wherein said delaying said second and first clock timing signals comprises delaying the second and first clock timing signals on the order of a few nanoseconds or less.

15. The method of claim 12, wherein said delaying said second and first clock timing signals comprises delaying the second and first clock timing signals so that the second clock timing signal precedes the first clock timing signal by a fraction of a clock cycle of the common high frequency clock.

16. The method of claim 15, wherein the first clock timing signal and the second clock timing signal have substantially the same frequency.

17. The method of claim 16, wherein said selectively delaying the transfer of said digital data signal comprises delaying the transfer of said digital data signal from the second clock timing domain to the first clock timing domain, based, at least in part, upon detecting that a change in the state of the first clock timing signal which will occur on a next clock pulse.

18. A device comprising: electronic circuitry for transferring a digital data signal along a digital signal path from a second clock timing domain, which receives a second clock timing signal having a relatively varying phase, to a timing domain, which receives a first clock timing signal having a relatively fixed phase;

said second and first clock timing domains including a second and a first flip-flop, respectively; said second and first flip-flops being driven by said second and first clock timing signals, respectively;

delay elements for providing said second and first clock timing signals so that the second clock timing signal precedes the first clock timing signal and respectively drives said second and first flip-flops;

said digital signal path further including a latch coupled between said second and first flip-flop so as to delay the transfer of said digital data signal from the second clock timing domain to the first clock timing domain at selected times.

19. The device of claim 18, further comprising a common high frequency source clock coupled to a clock generator circuit for providing said first and second clock timing signal;

wherein the second clock timing signal precedes the first clock timing signal by a fraction of a clock cycle of the common high frequency source clock.

20. The device of claim 19, wherein said latch selectively delays the transfer of said digital data signal from the second clock timing domain to the first clock timing domain.

21. The device of claim 20, wherein said latch is closed just prior to a change in state of the first clock timing signal.

22. An integrated circuit comprising: electronic circuitry for transferring a digital data signal along digital data signal path between different clock timing domains; said different clock timing domains comprising a first clock timing domain and a second clock timing domain; a common high frequency source clock being coupled to a clock generator circuit for providing a first and a second timing signal; said first clock timing signal having a relatively fixed phase; said second clock timing signal having a relatively varying phase; wherein said first and second clock timing domains receive said first and second clock timing signals, respectively;

said clock generator circuit including delay elements for providing said second and first clock timing signals so that the second and first clock timing signals are respectively staggered for only relatively short time compared with a given cycle of the common high frequency source clock;

said digital data signal path further including a data valve retention element coupled so as to transfer said digital data signal between said second and first clock timing domains and to delay the transfer of said digital data signal from said second to said first clock timing domain at selected times;

wherein said clock generator circuit further comprises a clock divider for producing the first clock timing signal for the first clock timing domain.

23. An integrated circuit comprising: electronic circuitry for transferring a digital data signal along a digital data signal path between different clock timing domains; said different clock timing domains comprising a first clock timing domain and a second clock timing domain; a common high frequency source clock being coupled to a clock generator circuit for providing a first and a second clock timing signal; said first clock timing signal having a relatively fixed phase; said second clock timing timing domains receive said first and second clock timing signals, respectively;

said clock generator circuit including delay elements for providing said second and first clock timing signals so that the second and first clock timing signals are respectively staggered for only a relatively short time compared with a given cycle of the common high frequency source clock;

said digital data signal path further including a data value retention element coupled so as to transfer said digital data signal between said second and first clock timing domains and to delay the transfer of said digital data signal from said second to said first clock timing domain at selected times;

wherein said clock generator circuitry comprises a digital phase locked loop for producing the second clock timing signal for said second timing domain.

* * * * *

UNITED STATES PATENT AND TRADEMARK OFFICE
CERTIFICATE OF CORRECTION

PATENT NO.      : 5,923,193                                    Page 1 of 1
DATED           : July 13, 1999
INVENTOR(S)     : Bloch et al.

It is certified that error appears in the above-identified patent and that said Letters Patent is hereby corrected as shown below:

Column 8,
Line 29, delete "wilt" and insert -- will --.
Line 61, delete "this particular time, the" and insert -- closes.  Therefore, during --.

Column 9,
Line 14, after "signal" insert -- path --.
Line 19, after "said" insert -- first --.
Line 61, after "first" insert -- clock --.

Column 10,
Line 11, after "first" insert -- and --.
Line 25, after "data" insert -- signal --.
Line 52, after second occurrence of "a" insert -- first clock --.

Column 11,
Line 4, delete "signal" and insert -- signals --.

Column 12,
Line 15, delete second occurrence of "timing" and insert -- signal having a relatively varying phase; wherein said first and second clock timing --.

Signed and Sealed this

Nineteenth Day of August, 2003

JAMES E. ROGAN
*Director of the United States Patent and Trademark Office*